United States Patent [19]

Wcislo et al.

[11] Patent Number: 4,557,038
[45] Date of Patent: Dec. 10, 1985

[54] INSTALLING A PREFABRICATED WINDING OF A LINEAR MOTOR

[75] Inventors: Manfred Wcislo, Ottobrunn; Otto Breitenbach, Nuremberg; Friedrich Schatz; Ulrich Riepling, both of Wedemark, all of Fed. Rep. of Germany

[73] Assignees: Kabelmetal Electro GmbH, Hanover; Thyssen Industrie AG, Essen, both of Fed. Rep. of Germany

[21] Appl. No.: 625,446

[22] Filed: Jun. 27, 1984

[30] Foreign Application Priority Data

Jul. 1, 1983 [DE] Fed. Rep. of Germany ....... 3323696

[51] Int. Cl.$^4$ ........................................... H02K 15/085
[52] U.S. Cl. ........................................ 29/596; 29/732; 29/824
[58] Field of Search ................ 29/596, 598, 605, 732, 29/824; 310/42, 12, 13, 27

[56] References Cited

U.S. PATENT DOCUMENTS 4,310,966  1/1982  Breitenbach ........................ 29/596

Primary Examiner—Carl E. Hall

[57] ABSTRACT

A polyphase winding of ladder-like configuration for a linear motor is installed into a prearranged inductor assembly having a plurality of parallely arranged grooves, the inductor being attached to the underside of a T-shaped type carrier; a vehicle runs on that carrier carrying a drum for storing the winding (cable assembly), and there is a deflection system which runs the winding from the drum towards the underside of the carrier in near-tangential disposition whereby a tool resiliently mounted on an outrigger causes rungs of the ladder to be sequentially forced into the grooves of the inductor and, possibly, locked therein.

8 Claims, 6 Drawing Figures

INSTALLING A PREFABRICATED WINDING OF A LINEAR MOTOR

BACKGROUND OF THE INVENTION

The present invention relates to the installation of prefabricated polyphase ac windings into the grooves of an elongated inductor structure of a linear motor.

The method and equipment of the type to which the invention pertains applies, for example, to those types of linear motors which include an inductor arranged along a track part having grooves open in down direction, and being fastened to the bottom of a cover plate of an elongated carrier having approximately the T-shaped profile. An arrangement of this type is, for example, disclosed in U.S. Pat. No. 4,310,966 including this feature and many of the following aspects of prior art construction and method, but differing from the invention as will be explained below. The prefabricated winding is a coherent ladder-like flexible cable assembly which, as a whole, is wound on a drum and hauled to the installation site. If the stator elements are not attached (as per this patent), then the inductor must be preassembled and fastened to the carrier and the cable assembly is step-by-step pressed by people into the grooves of the inductor under utilization of a support structure which is movable in some fashion along the inductor and arranged generally underneath thereof. Having, so to speak, the "rung" or "rungs" of the ladder forced into the grooves, additional steps are taken to maintain these rungs therein.

Generally speaking linear motors are known as an electric drive or better drive principle and they have been constructed in various ways. For example, they are known to operate as dc motors as ac synchronous motors, or as ac asynchronous motors. In the case of a linear motor, the stator as well as the "rotor" are not arranged in an annular or circular fashion, but along a line. Even though strictly speaking such a line can by and in itself be closed as far as the stator part is concerned, the operational principle is basically designed to have an indefinite beginning and indefinite end of such a stator. The movable element is not in the least geometrically matched to the overall contour of the stator and vice versa. Electrical energy is converted into mechanical energy to become immediately and directly usable as a translatory movement. In other words, a conversion from rotational movement into translatory movement is not necessary. The linear motor may generally be provided with an energization or exciter winding or coil arrangement being disposed in grooves of a stator, and one can readily provide a three phase configuration. This of course is shown in the above-mentioned patent. Further, to the state of the art in this regard, reference is made to U.S. Pat. Nos. 4,246,694 and 4,314,168.

The stator part generally in such a linear motor is constructed, for example, as a rail or bar made of electrically conductive material such as copper or aluminum. In this case then the motor is assumed to run on the asynchronous principle. Alternatively the runner may be constructed from permanent magnetic material, in which case a synchronous operational principle is employed. For purpose of completion, it should be mentioned that linear motors are known in which the winding is also or exclusively included in the movable element.

Linear motors of the type to which the invention pertains, and which have been referred to generally above, are, for example, used as transport vehicle, for example, as so-called people mover or in the field of conveying freight and other transport tasks. Also, production lines have been constructed with movable belts driven by such linear motor. Baggage transport and handling facilities are likewise known to be equipped with linear motors. Other fields are, for example, mining, crane dragging and carriages in machine tools, as well as structure for operating slides, gates, or the like. Depending upon the particular field of employment, the motor, i.e., the stator part, has to have a certain length. The windings are, as stated, placed in some fashion into the groove of the stator, and it is obvious that the longer the stator is, the more extensive and expensive will be the work to place the windings into the stator assembly. Obviously this kind of work has often required highly skilled workers.

If a linear motor is constructed with a long stator carrying the energization winding, and if such a drive is to be used for transport in general, then the stator of course is to be arranged along a particular transport path to establish, so to speak, the track of conveyance and transport. In this case then the active part of the stator, i.e., the inductor, is assembled first, usually being comprised of many separated assemblies of sheet and plate stock, and they are fastened to a suitable carrier facility. That carrier may well be designed as a vehicle rail on which the transport vehicle runs. As stated above, the windings are subsequently placed into the grooves of the stator part, and as described in various ways in some of the above-identified patents. This winding therefore has to be placed from below into the grooves, even if no particular auxiliary equipment is employed. Moreover, the windings have to be subsequently fastened. All this is quite extensive, whereby it has to be observed that the work is to be done overhead, i.e., usually above the normal activity level of people which is particularly tiring.

German printed patent application No. 2,827,150 discloses a method in which now the entire prefabricated winding is first placed on a plurality of supports which are arranged under the inductor or stator part. This thus prepositioned winding is then step-by-step placed into the grooves of the inductor. However, this method is still quite expensive in spite of the great help established through the prefabrication of the conductor assembly because still one needs manual labor for forcing the "rungs" into the grooves.

DESCRIPTION OF THE INVENTION

It is an object of the present invention to provide a new and improved method and equipment for installing prefabricated windings for linear motors into the stator part thereof, which permits automation of the placement operation without any significant expenditure.

It is a particular object of the present invention to provide a new and improved method and equipment for placing a prefabricated three-phase ac winding into the grooves of an elongated inductor of a linear motor being fastened to a carrier such as a T-shaped device, and having grooves which are open towards the bottom or in down direction.

In accordance with the preferred embodiment of the present invention, it is suggested that the windings as a coherent cable assembly of ladder-like configuration be earlier placed on a spool or drum in a manner known per se, and that spool is movably mounted onto a vehicle used at the installation site. The ladder-like winding and cable assembly is taken off the spool, and by means of a deflection system which includes rolls, it is run to an outrigger or boom that extends from the vehicle and carries a support. The windings are taken from that support towards a tool being resiliently mounted to the boom and by means of which the cables are automatically forced into the grooves of the inductor.

It can thus be seen that the prefabricated winding is automatically placed into the grooves of the inductor being mounted of course to a carrier, and placement involves primarily rolls of a defection system as well as the resiliently mounted tool. The individual rungs of the ladder-like winding and cable assembly may be already provided with fastening elements so that upon being placed into the groove the tool which performs the placement operation may also automatically fasten the windings in the grooves. The vehicle carrying the spool with the windings will be moved along preferably on the carrier until the entire winding has been unwound and placed into the grooves of the inductor in the stated manner. It may of course happen that the track is longer than the length of the winding that can be mounted on a single drum or spool, in which case the empty drum and spool is exchanged for a full one and placement of the winding can be continued.

The spool or drum carrying the winding as well as the deflection rolls may be actively driven, but the speed of rotation should be controlled in relation to the speed of the vehicle as it advances along the track. In order to avoid unnecessary torsion action upon the winding, it is suggested that a kind of storage loop be generated in that the winding hangs loose between the roll which extends laterally and beyond the carrier of the track system, and the roll running underneath the particular carrier for mounting the cable assembly towards the placement tool.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

Proceeding now to the detailed description of the drawings, reference is made first to FIG. 1 illustrating a portion of a stator assembly to be completed and assembled in accordance with the method of the invention under utilization of novel equipment. FIG. 1 in particular resembles to some extent FIG. 3 of the above-identified U.S. Pat. No. 4,310,966, but there are substantial differences. FIGS. 1 and 2 illustrate an inductor 6 which is composed of individual core elements 8 having, for example, a particular number such as four transverse grooves 5 and being individually mounted to a flange portion 9 of a carrier having T-shaped cross-section, i.e., flange 9 as seen in FIG. 2 in side elevation, and 10 represents the stem of the T. These elements 8 are separated from each other physically, for example, through an air gap or through insulation. They are therefore mounted to this carrier independently from the windings which are to be placed in the grooves 5. Therefore, this assembly differs from the assembly of FIG. 3 in the above-identified U.S. Pat. No. 4,310,966 wherein the core elements are part of a pre-assembly of the winding for the linear motor.

Figure 4:
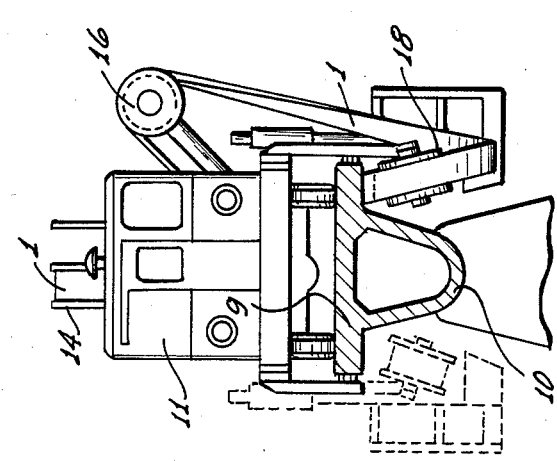
FIG. 4 is a front view of the equipment shown in FIG. 3.

The carrier 9-10 may be, for example, concrete. The T-shaped configuration can be seen in FIG. 4. The stem portion 10 is shown here to be hollow, and is itself carried in a suitable fashion, for example, by a plurality of columns or the like. The upper side of the flange 9 constitutes the rail for the installation vehicle such as 11 as shown in FIG. 4. Later, a transport vehicle may run on that rail, being propelled through linear motor action.

Figure 1:
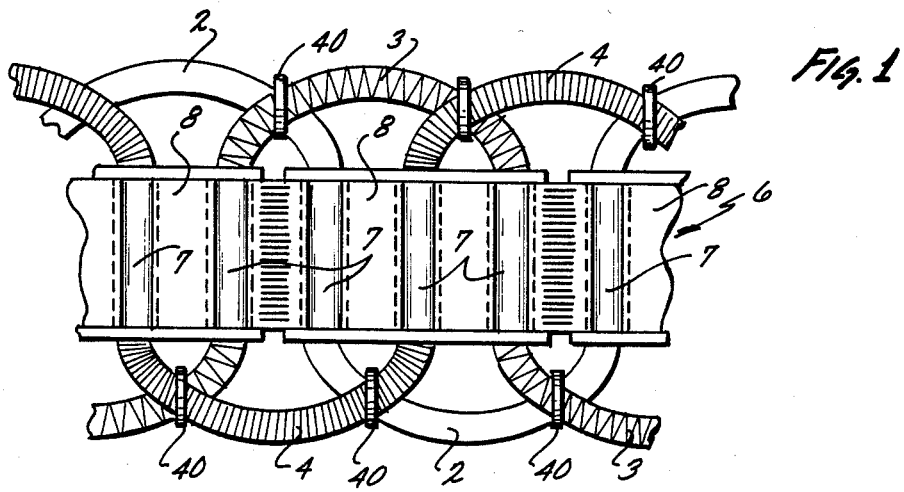
FIG. 1 is a top elevation of a stator in a linear motor of the type to which the invention pertains.
Figure 2:
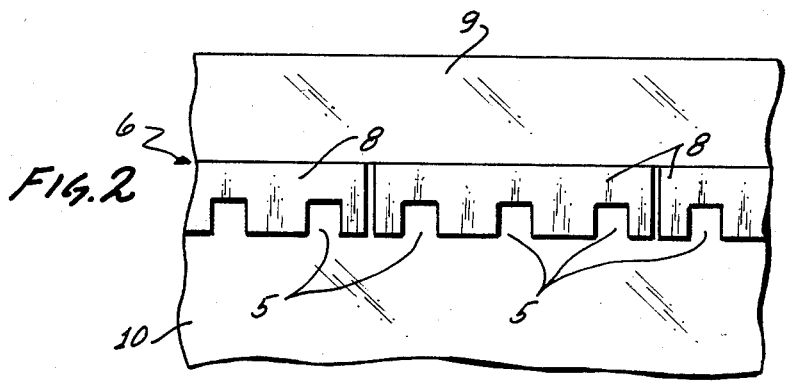
FIG. 2 is a section of a side elevation showing a carrier for a track system and including inductor portions of the linear motor without, however, any winding.

The cables constituting the windings are designated in FIG. 1 by reference numerals 2, 3 and 4, and are shown in these figures placed into the grooves 5. It is assumed that these cables come in an assembled, ladder-like configuration discernible from FIG. 1. Each of the three cables has meandering configuration and they have been interconnected in an overlapping pattern, for example, through ties such as 40. Together they constitute a ladder-like configuration with "rungs" which have been placed into the grooves 5. FIG. 1 illustrates also that the grooves 5 are closed after the cable portions have been placed into them by means of covers 7. Structure to this extent is also discernible, for example, in FIG. 4 of U.S. Pat. No. 4,310,966. Preferably these closure elements 7 are plates which are bent and resiliently engage in certain grooves extending at the appropriate locations laterally into the disk wells of the grooves 5.

It can thus be seen that the resulting and final assembly of a stator inductor and of an assembly of cable will be quite similar to the assembly depicted in the U.S. Pat. No. 4,310,966. There is, however, a substantial difference in the assembly which, to summarize, consists in an initial separation of the stator elements from the cable and windings in that the stator elements are preaffixed to the carrier (9, 10) and are not made part of a preassembly of the winding as per U.S. Pat. No. 4,310,966. The stator elements are therefore presently assumed to be part of the rail construction, and are affixed to that rail construction in a separate manufacture and assembly process; the invention and inventive procedure now relates specifically in placing the cable and winding assembly into the grooves or the stator inductor assembly as a whole.

Figure 3:
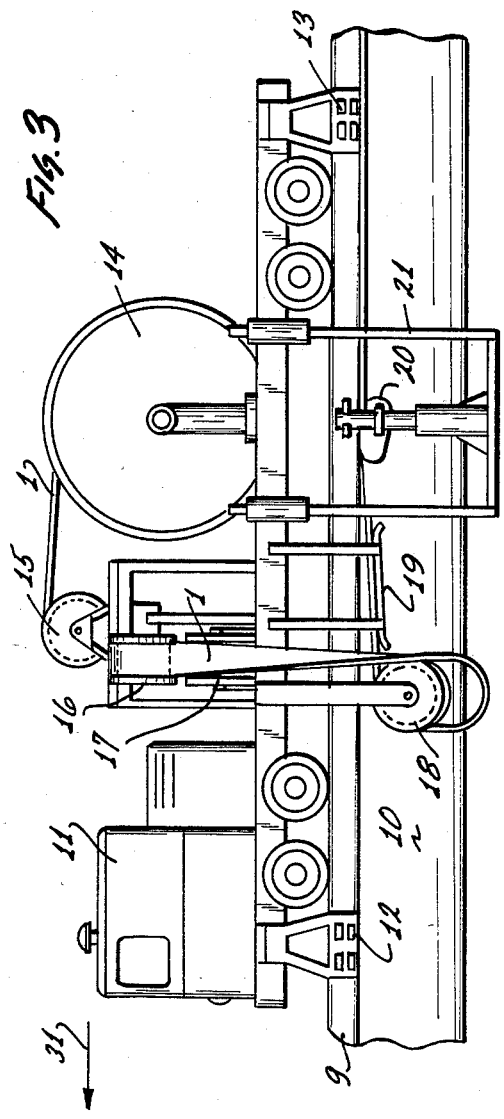
FIG. 3 is a side elevation of equipment including a vehicle for practicing the inventive method in accordance with the preferred embodiment, thereby practicing the best mode of the invention.
Figure 5:
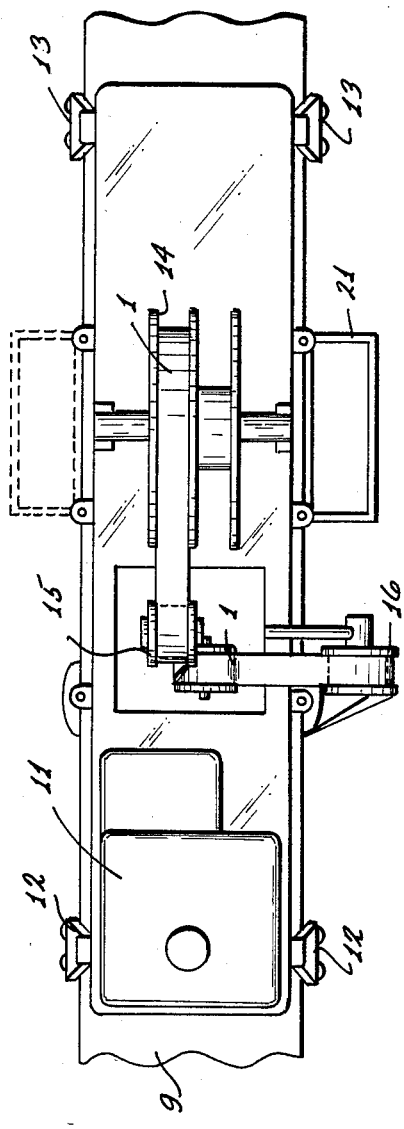
FIG. 5 is a top elevation of the equipment shown in FIGS. 3 and 4.

Proceeding now to the description of FIGS. 3 to 5, there is illustrated the equipment for carrying out the inventive method. This equipment is comprised primarily of the vehicle 11 being configured a flatbed truck with appropriate operating equipment on the flatbed. In the specific instance, it is moreover assumed that by means of its wheels the vehicle 11 can run on top of the flange 9 or carrier 10. Later on the vehicle to be propelled along this particular system will in an analogous configuration move on top of the flange 9 and along the reil construction of which the flange 9 and the carrier 10 are parts. The difference of course may be that the vehicle so propelled is not necessarily a wheeled vehicle, but may be suspended magnetically. However, that is not essential in principle.

The vehicle 11 is provided with lateral guide elements 12 and 13 which make sure that the vehicle remains centered on the track as defined by the flange 9 (edge 23 - FIG. 6) while it is moving there along. In particular, the guide elements 12 and 13 engage and guide the vehicle along the lateral edges of the cover plate unit 9. The guidance should be sufficiently accurate so that the tolerances with regard to any lateral deflecton of the vehicle movement are very minimal.

In this regard it should be noted that the cover plate 9 may have lateral dimensions which are very accurately machined because such accuracy may well be needed like for normal operation. For example, if the vehicle riding on the completed rail system is magnetically suspended and electrically driven it has to remain centered for obtaining an adequate amount of efficiency in its propulsion. Presently, however, it suffices to say that the vehicle 11 is moving by means of wheels and has its own drive which is independent from any subsequent drive mechanism involved in the system.

As far as the vehicle 11 itself is concerned, it has a flat bed as stated, and a supply spool or drum 14 is mounted centrally on the flat bed. That spool or drum 14 is the storage facility for a certain length of the winding and cable assembly 1. The spool or drum 14 of course can be removed from a journaling suspension so as to be replaced; thus an empty drum or spool can be replaced by a full one. The vehicle moreover carries a deflection system being comprised of a plurality of rolls or rollers such as 15, 16, 17 and 18. The winding 1 as withdrawn from the drum 14 is deflected in down direction by the roll 15 and changes orientation through the rolls 16 and 17 to be moved from an orientation on its own axis. Initially its central axis runs in the same vertical plume as the axis of the vehicle 11, but then the cable assembly is twisted and deflected laterally to lodge outside of the vehicle proper and on the rail strucutre 9 and 10.

Rolls 17 particularly guide the winding and cable assembly 1 down into a location below the level of the plate 9, and the roll 18 being obliquely oriented guides the winding 1 up again and directly towards the underside of the plate 9 in a near-tangential direction. In particular, the oblique roll 18 runs the winding 1 towards and onto a support 19 which is also a part of the vehicle and has a slight angle to the horizontal so as to run the winding 1 at a very shallow angle towards the underside of the plate 9.

The winding 1 and cable assembly will be received and gripped by a tool 20, which in fact forces the "ladder rung" portions of the winding assembly into the grooves 5. As will be described more fully below, the rungs of the ladder as defined may carry fastening elements such as 7, and the tool 20 may in addition snap these covers 7 into position to cover the grooves 5 once the respective cable portion has been received therein. If this particular aspect is not provided for, one would need a separate snapping and pressuring in operation for the fastening and holding elements 7, and this would require additional tooling or has to be done by hand. However, in this regard it should be noted that a combination may be provided for, particularly in view of the fact that it is most certainly advisable to inspect the proper installation on a running basis, particularly a uniform placement of the cable portions into the grooves 5 should be meticulously monitored.

The support 19, as well as the tool 20, are mounted to the vehicle through an outrigger-like or boom-like structure 21 which extend laterally from the vehicle 11 and is of course fastened-thereto. The outrigger 11 should be adjustable as to elevation, i.e., height, so that through folding any restriction on available space can be matched and accommodated. The movability of the outrigger 11 is particularly necessary in case installation is desired in more confined areas such as switches or stations.

In a preferred form of practicing the invention, the outrigger 11 may also be constructed to serve as an assembly platform which can support one or more persons which, as stated above, will observe whether or not the individual cable portions have been properly placed into the grooves 5 of the inductor 6, and whether or not the cover elements 7 are placed in proper position. He may at that point lend assistance to these operation, and make sure that all of these elements are in proper position, but, as stated above, he may also snap the covers 7 in position if the tooling is not provided for this operation. A suitable ladder may be provided so that this individual can mount the platform of the outrigger 21.

The drum 14 itself, as well as all of the rolls, or at least some of the rolls 15, 16, 17 and 18 may be individually driven, whereby of course it will be necessary to control their rotational speed so as to attain a constant linear speed of the winding 1; that speed must match the speed by means of which vehicle 11 moves along the platform. Therefore, it may be of advantage to slave the drive for these elements 14 through 18 to the speed by means of which the vehicle 11 is moved along the track. The control included here and particularly involving the control of some of the rolls 15 through 18 may include tension responsive means so that the tension in the cable assembly 1 as it is taken from the drum 14 does not exceed a certain value, nor should there be zero tension in locations where slack is not desired although certain slack may be provided for in a controlled fashion as will be explained next.

An essential aspect here of proper placement of the assembly is that the individual cable should not be mutually displaced within the assembly, as it is assumed that the cable assembly as such and the fastening of the cable portions to each other establishes these parallel cable portions equivalent to the rungs of a ladder, and which will in fact be placed in the various grooves 5. If these cables portions are not strictly parallel to each other, it may be difficult or even impossible for the tool to force and place them into these grooves 5.

It can be seen and was alluded to briefly above, the winding 1 being from an overall point of view of flat ribbon-like configuration is changed as to the orientation of its plane twice on the way from the drum 14 to the last one of the deflection roll system, which is roll 18. This of course poses the problem of torsional deformation of the winding-ribbon. But it is exactly for that reason that at least three deflection and transport rolls 15, 16 and 17 are provided on the path between the drum 14 and the roll 18 which guide the winding-ribbon so that its twisting is a very gradual one.

Irrespective of the fact that tension of taking the winding ribbon from the drum needs to be established, the avoidance of torsion may deem it advisable to provide for a certain buffer loop downstream from the withdrawal of the assembly; this is depicted in FIG. 3. Herein the windings 1 in fact loop between rolls 16–17 on one hand, and the roll 18 on the other hand. This makes sure that undue torsional twist in terms of a permanent distortion is avoided as far as the winding 1 is concerned.

Figure 6:
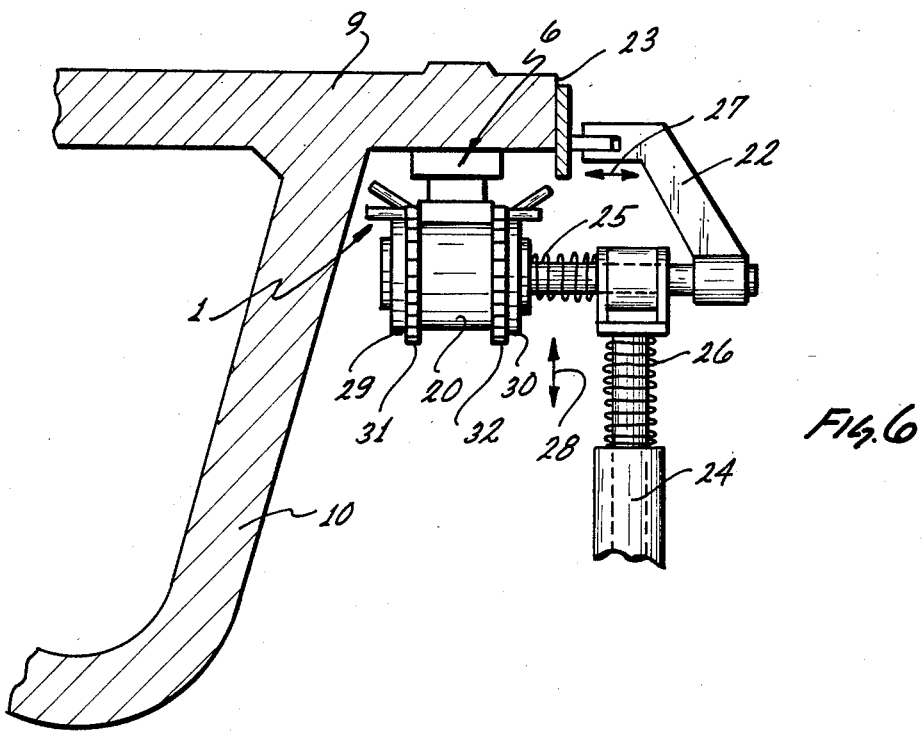
FIG. 6 is a partial cross-section through tooling used in the equipment shown in FIGS. 3, 4 and 5, but illustrating the tooling on an enlarged scale.

The tool 20 is depicted in greater detail in FIG. 6; the tool 20 itself is resiliently mounted on the outrigger 21 under utilization of springs 25 and 26 so as to permit resilient mounting basically in a direction transverse to the direction of the inductor as well as parallel thereto. Resilient mounting is indicated in FIG. 6 by the double arrows 27 and 28. This resilient mount permits the compensation of any inaccuracies in the guidance of the cable-winding if it is being guided into engagement with the inductor 6.

The tool 20 includes basically a drum-like element and wheels 31, 32 with teeth or grooves in gear-like fashion for gripping the rungs of the ladder in a sprocket-type fashion so as to permit accurate phase placement of the rungs of the ladder of the cable winding in relation to the linear pattern of the grooves 5 in the stator inductor 6. The rolls 29 and 30 engage the rungs of that ladder and force them into the grooves 5.

The tool 20 moreover is placed laterally in relation to the rail and cover plate 9 through an arm 22 having an end feeler and adjustment plate 29 engaging the edge 23 of the plate 9. This way the tool is accurately guided in relation to the geometry of the rail 9, and of course the stator assembly thereon, and here particularly the inductor elements 6; they are particularly positioned under that cover plate 9 in relation to the reference edge 23.

The two lateral rolls 29 and 30 could be replaced by endless belts or ribbons. Essential of course is that the central paralleled parts of the winding 1, i.e., the rungs of the cable ladder, will be placed in phase synchronism with the grooves 5, and are forced into these grooves at each instance. The actual press working is carried out by rolls which hold these ladder rungs of the cable and winding 1 from below. It should be noted, that the roll assembly 15–18 makes sure that the cable assembly is taken at a speed matching the placement speed into the inductor; the placement disks 31, 32 make sure that the phase of this operation matches the distribution pattern of the grooves 5 on the rail and stator structure.

It can thus be seen that as vehicle 11 drives on the track 9, the ladder is in effect withdrawn from the drum 14, properly guided into the appropriate position, and step-by-step its rungs are pressed into the grooves 5 of the inductor 6. As soon as the spool or drum 14 is empty, the operation stops and a new supply spool and drum is placed onto the vehicle, and the end of the previous winding is physically as well as electrically connected to the beginning of the new supply. Thus it can readily be seen that the installation can proceed basically on a basis of an indefinite length of the track to be so provided with a coil and winding configuration for the stator of a linear motor. It should be mentioned, however, that the assembly as such requires merely a phase coherent mounting and transition; the physical connection and as well as the electrical connection between the ends of two strings of windings can be carried out subsequently.

The dashed lines in the FIGS. 4 and 5 indicate that two cable assemblies can be installed at the same time, one per branch on the carrier 9.

The invention is not limited to the embodiments described above, but all changes and modifications thereof not constituting departures from the spirit and scope of the invention are intended to be included.

We claim:

1. Method of applying and fastening a prefabricated polyphase cable-winding assembly into the grooves of an inductor pertaining to a stator for a linear motor arranged along the underside of an overhung carrier, and wherein said grooves are arranged in parallel to each other essentially transverse to the linear extension of the stator, and wherein the cable-winding assembly resembles a ladder and cable portions resemble the rungs of a ladder comprising the steps of:
   providing the cable assembly on a drum, the drum being placed on a vehicle, the vehicle running on said carrier;
   unreeling said cable assembly from the drum as the vehicle runs on said carrier;
   deflecting said cable assembly as unreeled through outrigger means and providing it to run towards said underside of said carrier in near-tangential fashion; and
   causing a tool to engage said cable-winding so as to force said near-tangentially running cable assembly progressively into said groove.

2. Method as in claim 1 and including the step of providing for linear active driving advance of said cable assembly as it is withdrawn from said drum.

3. Method as in claim 1 and including the step of driving said drum.

4. Method as in claim 1 and including the step of centering said tool in relation to a lateral edge of said carrier.

5. Method as in claim 1 and including the step of controlling the tension of withdrawing said cable-winding from said drum.

6. Method as in claim 5 and including the step of interposing a buffer loop in said winding.

7. Method as in claim 6 and including the step of changing the orientation of said winding at least once on its propagation path from the drum to said tool.

8. Method as in claim 1 and including resiliently mounting said tool as it applies said winding to said grooves.

* * * * *